(12) United States Patent
Tanaka

(10) Patent No.: US 7,177,039 B2
(45) Date of Patent: Feb. 13, 2007

(54) DATA RECEIVING APPARATUS AND IMAGE FORMING APPARATUS USING THE SAME

(75) Inventor: Tomoji Tanaka, Osaka (JP)

(73) Assignee: Minolta Co., Ltd., Osaka (JP)

( * ) Notice: Subject to any disclaimer, the term of this patent is extended or adjusted under 35 U.S.C. 154(b) by 978 days.

(21) Appl. No.: 09/797,966

(22) Filed: Mar. 5, 2001

(65) Prior Publication Data

US 2001/0019626 A1 Sep. 6, 2001

(30) Foreign Application Priority Data

Mar. 6, 2000 (JP) ............................. 2000-061195

(51) Int. Cl.
*G06F 15/00* (2006.01)
*G06F 3/12* (2006.01)

(52) U.S. Cl. ..................... 358/1.15; 358/3.03

(58) Field of Classification Search ............... 358/1.15, 358/1.14, 1.13, 1.9, 3.03, 3.3; 382/162
See application file for complete search history.

(56) References Cited

U.S. PATENT DOCUMENTS

| | | | | |
|---|---|---|---|---|
| 5,130,820 A | * | 7/1992 | Hirota | 358/447 |
| 5,272,529 A | * | 12/1993 | Frederiksen | 375/240.22 |
| 5,963,674 A | * | 10/1999 | Takeuchi et al. | 382/239 |
| 6,011,907 A | * | 1/2000 | Shimura et al. | 358/3.03 |
| 6,751,346 B2 | * | 6/2004 | Shimizu | 382/162 |

FOREIGN PATENT DOCUMENTS

| | | |
|---|---|---|
| JP | 63-078640 A | 4/1988 |
| JP | 02-016866 A | 1/1990 |
| JP | 08-307358 A | 11/1996 |
| JP | 09-008988 A | 1/1997 |
| JP | 10-126349 | 5/1998 |
| JP | 10-224309 | 8/1998 |

* cited by examiner

*Primary Examiner*—Dov Popovici
(74) *Attorney, Agent, or Firm*—Morrison & Foerster LLP

(57) ABSTRACT

A sample hold circuit is disposed which, in accordance with a hold signal, can selectively execute either of outputting a threshold signal output from an Automatic Threshold Control circuit, to a comparator as a threshold signal while allowing the voltage to be as it is, or outputting the signal while holding the voltage. Immediately before reception of synchronizing data in which signals of "1" and "0" are alternatingly repeated is ended, the voltage of the threshold signal is held by a sample hold circuit. Therefore, when effective data is received after the synchronizing data, the voltage of the threshold signal is constant. The comparator compares the voltage of the input signal with the voltage of the threshold signal used as a reference. Based on a result of this comparison, a digital signal is reproduced from the input signal. Even when data such as image data containing data in which "0" is continued for a long time period is received, erroneous detection does not occur, and the transmission speed can be made higher.

21 Claims, 10 Drawing Sheets

DATA RECEIVING APPARATUS AND IMAGE FORMING APPARATUS USING THE SAME

The present application claims priority to Japanese Patent Application No. 2000-61195 filed Mar. 6, 2000, the entire content of which is hereby incorporated by reference.

BACKGROUND OF THE INVENTION

1. Field of the Invention

The present invention relates to a data receiver, and more particularly to an improvement of the technique of reproducing a digital signal from received data.

2. Description of the Related Art

In the field of an image forming apparatus, for example, cases where an optical transmission system using an optical fiber cable is employed as a system for transmitting image data of an original which is read by a scanner unit, to a printer unit in a location separated from the scanner unit are increasing.

When image data is to be transmitted by an optical transmission system, a transmitter which converts the image data in the form of a digital signal into an optical signal that is a blinking optical signal, and which then outputs the optical signal to an optical fiber cable is disposed in a scanner unit serving as a transmitting side for the image data, and a receiver which receives the optical signal to reproduce the digital signal is disposed in a printer unit serving as a receiving side.

In the receiver, when the voltage of an input signal which has been photoelectrically converted is not lower than a voltage set as a threshold (hereinafter, such a voltage is referred to as threshold voltage), the signal is judged to be "1," and, when the voltage is lower than the threshold voltage, the signal is judged to be "0." In recent years, such a threshold voltage is often set by using an Automatic Threshold Control circuit (hereinafter, referred to as ATC circuit) which automatically adjusts the threshold voltage in accordance with the voltage of an input signal.

An ATC circuit holds the voltage of an input signal by charging an incorporated capacitor, and then outputs a voltage which is about one half of the held voltage, as a threshold signal.

FIG. 1 is a view diagrammatically showing voltage waveforms of an input signal 910 and a threshold signal 920 in a receiver having an ATC circuit.

As shown in the figure, when a signal indicative of "1" is input for a fixed time period as the input signal 910, the voltage of the threshold signal 920 is about one half of that of the signal. When the signal of "1" is followed by an input of a signal indicative of "0," the voltage of the signal is substantially 0 volt, and hence the voltage of the threshold signal 920 is gradually lowered by discharging of the capacitor. When a signal indicative of "1" is thereafter input, the capacitor is again charged, with the result that the voltage waveform shown in the figure is obtained and an output signal 930 is reproduced. The charging and discharging rates of the capacitor depend on the time constant which is determined by the capacitance of the capacitor and the internal resistance. Usually, the charging and discharging rates are set so that, as shown in the figure, charging and discharging of the capacitor are adequately performed in accordance with the input signal 910 and the threshold voltage is maintained within an appropriate range.

However, image data includes data in which a signal of "0" or "1" is continued for a long time period corresponding to a portion where no image is formed or a solid color portion of an image. When a signal of "0" is received for a long time period, for example, only discharging of the capacitor is performed for a long time period and the threshold voltage is lowered to a substantially 0 volt as indicated by a waveform 921 of the figure. When a signal 911 of "1" is thereafter input, charging of the capacitor is started. In this case, the rising of the threshold voltage requires a time period longer than that in a usual case. Therefore, the signal reproduction is performed before the threshold voltage has not yet been raised to a sufficient level, thereby producing a situation in which the signal of "1" is reproduced earlier by a time period 932 than a signal such as the signal 931 which is to be originally reproduced (hereinafter, the time period 932 is referred to as error time period). In order to prevent such a situation from arising, the capacitance of the capacitor may be reduced to increase the charging rate. When the capacitance of the capacitor is reduced, however, also the discharging rate is increased, and hence the threshold voltage is unstably held. Therefore, the reduction of the capacitance of a capacitor is limited.

The thus reproduced signal 931 tends to cause erroneous detection in sampling. This is more conspicuous as the data transmission speed is higher. When the transmission speed is made higher, the width of a 1-bit signal is shorter. Therefore, the ratio of the error time period 932 with respect to the one-pulse width is larger than that with respect to the one-pulse width in a low transmission speed. When the sampling timing is deviated even by a small degree, consequently, a portion corresponding to the error time period 932 is sampled. In other words, a situation in which a portion that is originally indicative of "0" is erroneously judged to be "1" easily occurs. In the conventional art, therefore, the transmission speed cannot but be set low or to a degree at which, even when a signal of "0" is continued, sampling of a reproduced signal is not adversely affected, with the result that the transmission speed cannot be made higher.

SUMMARY OF THE INVENTION

It is an object of the invention to provide a data receiver in which a threshold voltage is automatically adjusted, and, even when data containing that wherein "0" is continued for a long time period, such as image data is received, the transmission speed can be made higher without causing erroneous detection, and also an image forming apparatus having such a data receiver.

The foregoing and other objects can be attained by a data receiver comprising:

receiving means for receiving control data and effective data which is sent after the control data;

threshold holding means for holding a threshold which is adjusted on the basis of a size of the control data; and quantizing means for quantizing the effective data on the basis of the threshold held by the threshold holding means.

The foregoing and other objects can be attained also by an image forming apparatus comprising:

receiving means for receiving an optical signal for plural frames, each of the frames containing control data and image data subsequent to the control data;

threshold holding means for holding a threshold which is adjusted on the basis of a size of the control data;

quantizing means for quantizing the image data on the basis of the threshold held by the threshold holding means; and image forming means for forming an image on the basis of the image data output from the quantizing means.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DETAILED DESCRIPTION OF THE PREFERRED EMBODIMENTS

Hereinafter, an embodiment of a copier having a data receiver according to the invention will be described with reference to the accompanying drawings.

Figure 1:
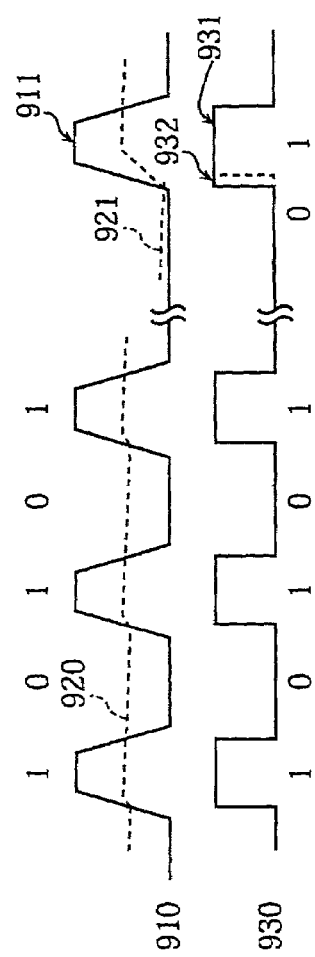
FIG. 1 is a view diagrammatically showing voltage waveforms of an input signal and a threshold signal in a receiver having a conventional ATC circuit.
Figure 2:
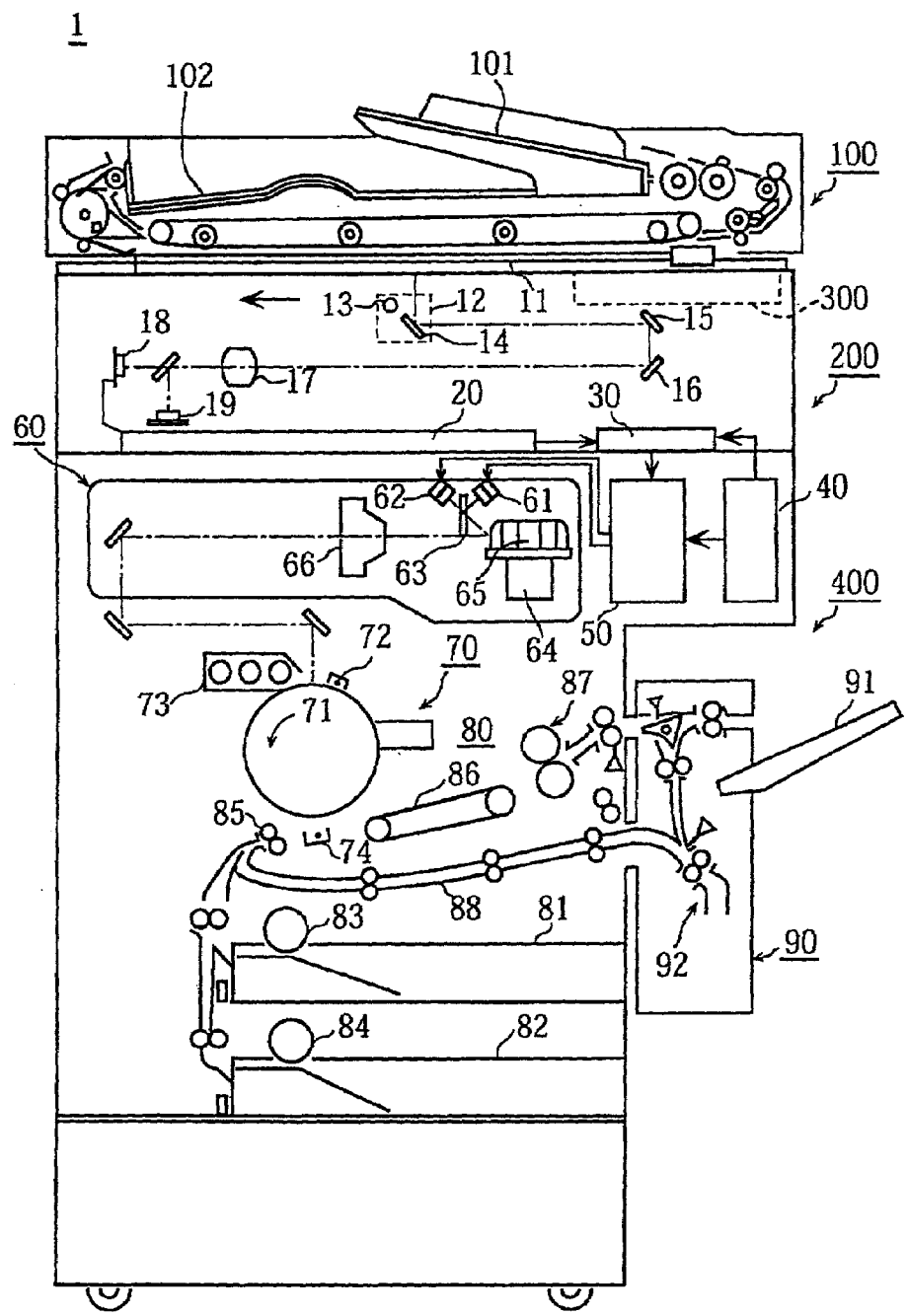
FIG. 2 is a view showing the entire configuration of a copier.

FIG. 2 is a view showing the entire configuration of the copier 1.

As shown in the figure, the copier 1 is generally configured by: an automatic document feeder 100 which automatically feeds originals; an image reader unit 200 which reads an image of a fed original; a printer unit 400 which prints the image which is read by the image reader unit 200, on a sheet to reproduce the image; and a refeeding unit 90 which inverts the sheet that has been once subjected to the printing process by the printer unit 400, and then refeeds the sheet to the printer unit 400.

The automatic document feeder 100 feeds an original which is placed on an original supply tray 101, to a predetermined original reading position that is set on a platen glass 11, and then discharges the sheet that has been scanned by a scanner 12 of the image reader unit 200, to an original discharge tray 102.

The image reader unit 200 comprises the scanner 12 having an exposure lamp 13 which illuminates the original, CCD sensors 18 and 19, an image signal processing section 20, and an image data transmitting section 30.

The original which is fed from the automatic document feeder 100 to the original reading position of the platen glass 11 is exposure-scanned by the scanner 12. The image of the exposure-scanned original is sent via return mirrors 14 to 16 and a condenser lens 17 to the CCD sensors 18 and 19, to be photoelectrically converted thereby into electric signals. The electric signals are sent to the image signal processing section 20.

The image signal processing section 20 applies known image processes such as binarization, image correction, and image edition on the electric signals sent from the CCD sensors 18 and 19, to produce image data, and sends the image data to the image data transmitting section 30.

The image data transmitting section 30 transmits the image data sent from the image signal processing section 20, to a print processing section 50 of the printer unit 400 by the bit serial transmission method based on optical communication in a manner which will be described later. The image data transmitting section 30 and the print processing section 50 are connected to each other by a known optical fiber cable 204 (see FIG. 3).

The printer unit 400 forms an image by means of the electrophotographic method, and consists of an exposure scanning section 60, an image forming section 70, a sheet conveying section 80, and the print processing section 50.

The print processing section 50 receives the image data sent from the image data transmitting section 30, and optically modulates laser diodes 61 and 62 of the exposure scanning section 60.

Laser beams emitted from the laser diodes 61 and 62 are combined with each other by a dichroic mirror 63. The composite beam is deflection-scanned by a polygon mirror 65 which is rotated by a motor 64, to exposure-scan a photosensitive drum 71 of the image forming section 70 via a scanning lens 66 in the main scanning direction.

Before exposure by the laser beam, residual toner is removed away from the photosensitive drum 71 by a cleaner (not shown), and the photosensitive drum is then uniformly charged by a charger 72. When the surface of the charged photosensitive drum 71 is exposed to the laser beam, an electrostatic latent image is formed. The electrostatic latent image is developed as a toner image by a developer 73.

On the other hand, a sheet is picked up from a sheet cassette 81 or 82 of the sheet conveying section 80 by a pickup roller 83 or 84, and the sheet is then conveyed by a timing roller 85 to a transferring position immediately below the photosensitive drum 71 in accordance with an exposure scan timing of the laser beam. The toner image on the photosensitive drum 71 is transferred to the sheet in the transferring position by the function of a transfer charger 74. The sheet to which the toner image has been transferred is conveyed by a conveyor belt 86, and the toner is fixed by a fixing device 87. Thereafter, the sheet is sent to the refeeding unit 90.

In a two-sided copy mode in which the printing process is performed on both the front and rear faces of a sheet, when the printing process on the rear face has not yet been performed, the refeeding unit 90 inverts, in an inverting section 92, the sheet sent from the printer unit 400, and conveys the inverted sheet into a conveying path 88 of the printer unit 400. The sheet conveyed into the conveying path 88 is further conveyed to the timing roller 85, and the printing process is then performed on the rear face by the image forming section 70. When it is not required to invert the sheet, the sheet is discharged onto a sheet discharge tray 91.

A controlling unit 40 collectively controls the automatic document feeder 100, the image reader unit 200, the printer unit 400, and the refeeding unit 90 so as to smoothly implement a copying operation.

An operation panel 300 is placed in a position which is in the front face of the image reader unit 200 and at which operations can be easily performed. Through the operation panel 300, the user can perform operations such as setting of the number of copy sets, instructions for starting a copy process, and setting one of various copy modes including the two-sided copy mode.

Figure 3:
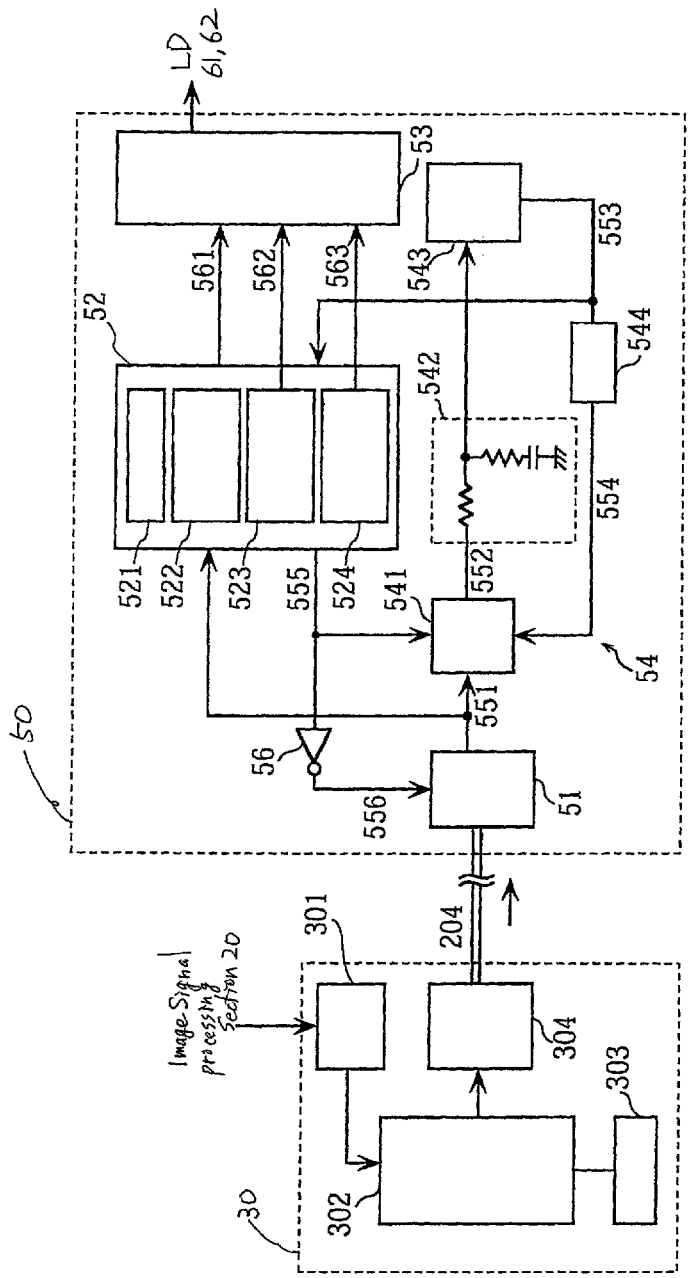
FIG. 3 is a block diagram showing the configuration of an image data transmitting section and a print processing section of the copier.

FIG. 3 is a block diagram showing the configuration of the image data transmitting section 30 and the print processing section 50.

As shown in the figure, the image data transmitting section 30 consists of an image memory 301, a serial data transmitting portion 302, a reference clock outputting portion 303, and an electro-optic converter 304.

The image memory 301 receives the image data which is sent from the image signal processing section 20, and temporarily stores the data. In response to instructions from the controlling unit 40, image data which is to be subjected to image formation is sent to the serial data transmitting portion 302.

The serial data transmitting portion 302 receives the image data sent from the image memory 301, converts the data into those having a predetermined configuration suitable for demodulation in the print processing section 50, and then sends out the data. In the embodiment, as described later, synchronizing data 601, a start bit 602, and effective data 606 are configured as one frame (see FIG. 4), and these data are sent as bit serial data 551 to the electro-optic converter 304.

The reference clock outputting portion 303 gives a reference clock signal to the serial data transmitting portion 302.

The electro-optic converter 304 converts the bit serial data (electric signal) sent from the serial data transmitting portion 302, into an optical signal (blinking signal), and transmits the signal to the print processing section 50 via the optical fiber cable 204.

The print processing section 50 consists of an light receiving portion 51, a data demodulating portion 52, a print output controlling portion 53, and a PLL circuit portion 54.

The light receiving portion 51 receives the optical signal which is sent from the image data transmitting section 30 via the optical fiber cable 204, converts the signal into an electric signal, and reproduces the bit serial data 551 in the form of a digital signal by using the threshold which is adjusted by an incorporated ATC circuit. The reproduced bit serial data is sent to the data demodulating portion 52, and a phase comparator 541 of the PLL circuit portion 54. The configuration of the light receiving portion 51 will be described later.

The PLL circuit portion 54 is a known closed loop circuit which generates clock pulses in phase with an input signal. In the embodiment, the PLL circuit portion is configured by the phase comparator 541, a low-pass filter (LPF) 542, a VCO 543, and a frequency divider 544.

The phase comparator 541 produces a phase difference signal (pulse) 552 corresponding to the phase difference between the received bit serial data 551 and a frequency-divided clock signal 554 which is output from the frequency divider 544, and supplies the phase difference signal to the LPF 542.

The LPF 542 is a low-pass filter circuit which is configured by resistors and a capacitor, and which, when receiving the phase difference signal 552 from the phase comparator 541, removes high frequency components and noises from the signal, and smoothes the signal. The smoothed signal is supplied to the VCO 543.

The VCO 543 is a known voltage-controlled oscillator which changes the oscillation frequency of an output signal in accordance with the applied voltage, produces a reception clock signal 553 according to the output voltage of the LPF 542, and supplies the clock signal to the frequency divider 544. The reception clock signal 553 is sent also to the data demodulating portion 52, as a signal for latching the bit serial data 551.

The frequency divider 544 is configured by a flip-flop circuit which operates at a rising edge of the reception clock signal 553 that is produced by the VCO 543, produces a frequency-divided clock signal 554 which is obtained by quadrupling the period of the reception clock signal 553, and supplies the frequency-divided clock signal to the phase comparator 541.

In this configuration, when a phase difference occurs between the bit serial data 551 and the frequency-divided clock signal 554 from the frequency divider 544, in order to adjust the frequency of the reception clock signal 553 so as to eliminate the phase difference, the phase comparator 541 outputs as a pulse signal the phase difference signal 552 which causes charges to be injected into or ejected from the capacitor of the LPF 542, thereby changing the voltage applied to the VCO 543. Therefore, the oscillation frequency of the reception clock signal 553 is changed. As a result, the PLL closed-loop control functions so that the rising edges of the bit serial data 551 and the frequency-divided clock signal 554 coincide with each other to eliminate the phase difference, and a stable condition is attained. At this time, the frequency of the reception clock signal 553 is exactly four times that of the bit serial data 551, and the timing of the rising edge of the signal coincides with that of the bit serial data 551. Therefore, the signal is suitable for latching the bit serial data 551.

The phase comparator 541 is configured so as to operate only when a hold signal 555 from the data demodulating portion 52 is at "L" level. When the hold signal is changed to "H" level, the phase comparator 541 stops operating to set the output terminal to a high-impedance state (halt of the PLL control). This causes the charges of the capacitor of the LPF 542 to be held, so that the output voltage to the VCO 543 is fixed. Therefore, the reception clock signal 553 is continued to be sent to the data demodulating portion 52 while its frequency is fixed to the value at the timing when the hold signal 555 is changed to "H" level. The output control which is performed on the hold signal 555 by the data demodulating portion 52 will be described later. The hold signal 555 is sent also to the light receiving portion 51 via an inverter 56 (hereinafter, a signal in which the output level is inverted by the inverter 56 is referred to as a hold signal 556).

The data demodulating portion 52 samples the bit serial data 551 sent from the light receiving portion 51, by means of the reception clock signal 553, and sends the sampled data to the print output controlling portion 53. The data demodulating portion controls the operation of the PLL circuit portion 54, and has a counter 521, a start bit detecting portion 522, a main-scanning region signal producing portion 523, and a sub-scanning region signal producing portion 524.

The start bit detecting portion 522 detects the start bit of the bit serial data 551.

An example of the configuration of the bit serial data 551 will be described with reference to FIG. 4. As shown in the figure, in the bit serial data 551, a data string of the synchronizing data 601, the start bit 602, and the effective data 606 is configured as one frame, and such a frame is repeatedly transmitted. The effective data 606 is configured by sub-scanning image region data 603, main-scanning image region data 604, and image data 605.

The start bit 602 is a signal indicating that the effective data 606 exist subsequently to the bit, and used for attaining the timing of starting the operation of counting the number of received bits.

The sub-scanning image region data 603 indicates the image region in the sub-scanning direction in the image formation, and the main-scanning image region data 604 indicates the image region in the main scanning direction. Each of the region data is configured by a 16-bit signal. When both the data 603 and 604 are detected, it is possible to know the number of bits which are sent as the image data 605.

The synchronizing data 601 consists of a bit string in which "1" and "0" are alternatingly repeated. In the embodiment, one frame constitutes data corresponding to one scanning line in the case where the photosensitive drum 71 is exposure-scanned.

Figure 4:
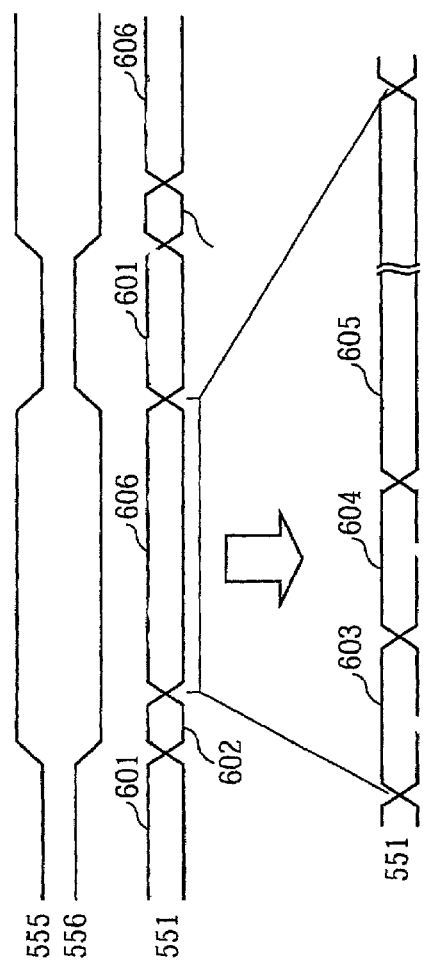
FIG. 4 is a view showing an example of the configuration of bit serial data.

Referring again to FIG. 3, when the start bit 602 is detected by the start bit detecting portion 522, the data demodulating portion 52 starts the operation of counting the number of the received bits by using the counter 521, and maintains the hold signal 555 to "H" level until the counted number reaches a value corresponding to the end of the reception of the effective data 606 (see FIG. 4). The count value is determined on the basis of the bit number of the image data 605 in one frame which number can be known from the sub-scanning image region data 603 and the main-scanning image region data 604.

When the number reaches the count value, the synchronizing data 601 is to be then input, and hence the data demodulating portion 52 sets the hold signal 555 to "L" level (see FIG. 4). Then, the counting of the number of received bits of the synchronizing data 601 is continued. When the counted number reaches a value corresponding to the reception timing of the bit immediately before the end of the reception of the synchronizing data 601, for example, the bit indicating the last "1" of the bit string of the synchronizing data 601, the hold signal 555 is returned to "H" level, and the counter 521 is once reset to start a new counting operation. In the embodiment, the total received bit number of the synchronizing data 601 is previously determined. Therefore, the count value at the timing when the reception of the synchronizing data 601 is ended can be previously obtained by adding the total received bit number to the count value of the counter 521 which is detected during the reception. The timing immediately before the end of the reception can be detected on the basis of the value.

In the data demodulating portion 52, as described above, when reception of the synchronizing data 601 is started, the hold signal 555 is set to "L" level to cause the PLL circuit portion 54 to execute the PLL control, thereby producing the reception clock signal 553 the rising edge of which is coincident in timing of the rising edge with the synchronizing data 601. Immediately before the end of the reception of the synchronizing data 601, the hold signal 555 is changed to "H" level to stop the PLL control, whereby the frequency of the reception clock signal 553 is fixed.

When it is detected that the count value of the counter 521 reaches that at which the image data 605 in the bit serial data 551 is sent, the image data 605 is latched and sampled by using the reception clock signal 553 which is sent from the PLL circuit portion 54, to be converted into 8-bit parallel data (image data) 561. The data is then output to the print output controlling portion 53.

The main-scanning region signal producing portion 523 monitors the count value of the counter 521. When it is detected that the count value of the counter 521 reaches that at which the main-scanning image region data 604 in the bit serial data 551 is sent, the portion 523 samples the data 604 by using the reception clock signal 553 to convert the data into 16-bit parallel data, and supplies the parallel data to the print output controlling portion 53, as a main-scanning image region signal 562.

The sub-scanning region signal producing portion 524 monitors the count value of the counter 521. When it is detected that the count value of the counter 521 reaches that at which the sub-scanning image region data 603 in the bit serial data 551 is sent, the portion 524 samples the data 603 by using the reception clock signal 553 to convert the data into 16-bit parallel data, and supplies the parallel data to the print output controlling portion 53, as a sub-scanning image region signal 563.

The print output controlling portion 53 produces signals for optically modulating the laser diodes 61 and 62, on the basis of the image data 561, the main-scanning image region signal 562, and the sub-scanning image region signal 563 which are sent from the data demodulating portion 52, whereby the laser diodes 61 and 62 are optically modulated.

Figure 5:
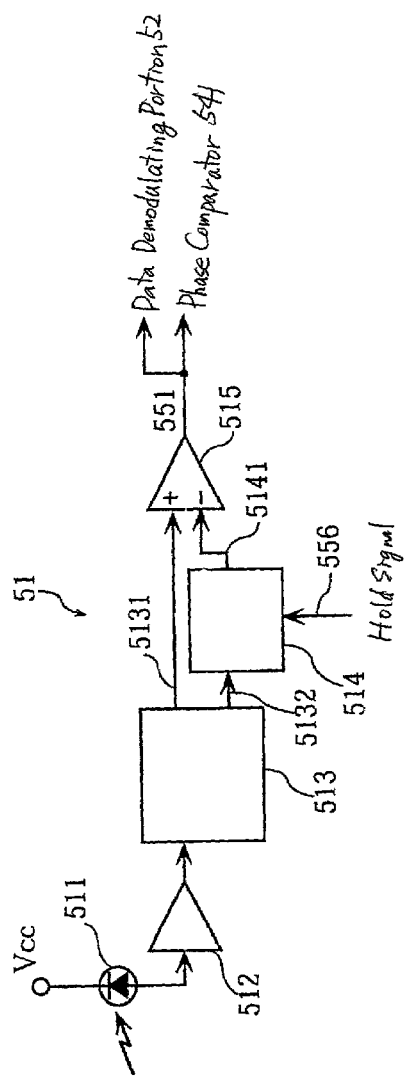
FIG. 5 is a block diagram showing the configuration of a light receiving portion of the print processing section.

FIG. 5 is a block diagram showing the configuration of the light receiving portion 51.

As shown in the figure, the light receiving portion 51 consists of a photodiode 511, an amplifier 512, an ATC circuit 513, a sample hold circuit 514, and a comparator 515.

The photodiode 511 receives the optical signal sent via the optical fiber cable 204, and converts the signal into an electric signal (current).

The converted electric signal is amplified or voltage-converted to a predetermined level by the known amplifier 512 which is configured by an operational amplifier and the like, and then input into the ATC circuit 513.

The ATC circuit 513 is configured by a known automatic threshold adjusting circuit, and branches the input signal into two signals. One of the two signals is supplied as it is to the comparator 515 as a signal 5131. The peak voltage of the other signal is detected by a peak-value detecting circuit. While the voltage is held by a holding circuit consisting of a capacitor and a resistor, the voltage is divided into one half by resistors or the like. The divided voltage is supplied as a threshold signal 5132 to the sample hold circuit 514.

Figure 6:
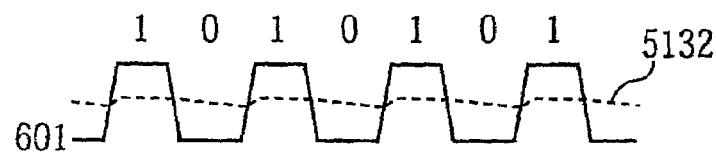
FIG. 6 is a diagram showing the voltage waveform of a threshold signal in the case where synchronizing data is input into an ATC circuit.

FIG. 6 is a diagram showing the voltage waveform of the threshold signal 5132 in the case where the synchronizing data 601 is input into the ATC circuit 513.

When a signal of "1" (the voltage exists) of the synchronizing data 601 is input as shown in the figure, the capacitor is charged, and the voltage of the signal 5132 is about one half of the signal of "1." When a signal of "0" (the voltage does not exist) is thereafter input, the capacitor is discharged, and the voltage is gradually lowered by the discharging of the capacitor. When a signal of "1" is again input, the capacitor is charged, and the voltage is about one half of the signal of "1." In the case of data in which "0" and "1" are alternatingly repeated, such as the synchronizing data 601, charging and discharging of the capacitor are adequately repeated, so that the voltage is stabilized in a state where it finely vibrates in level with respect to about one half of the signal of "1." The charging and discharging rates of the capacitor depend on the time constant of the holding circuit. As described in the related art paragraph above, when data of "0" is continued for a long time period, the voltage of the threshold signal 5132 is gradually lowered by discharging of the capacitor.

Referring again to FIG. 5, when the hold signal 556 becomes "H" level, the sample hold circuit 514 supplies the voltage of the threshold signal 5132 from the ATC circuit 513, as it is to the comparator 515, and, when the level of the hold signal 556 is changed from "H" to "L," the sample hold circuit supplies the threshold signal 5132 to the comparator 515 while the voltage of the threshold signal at this timing is held.

Figure 7:
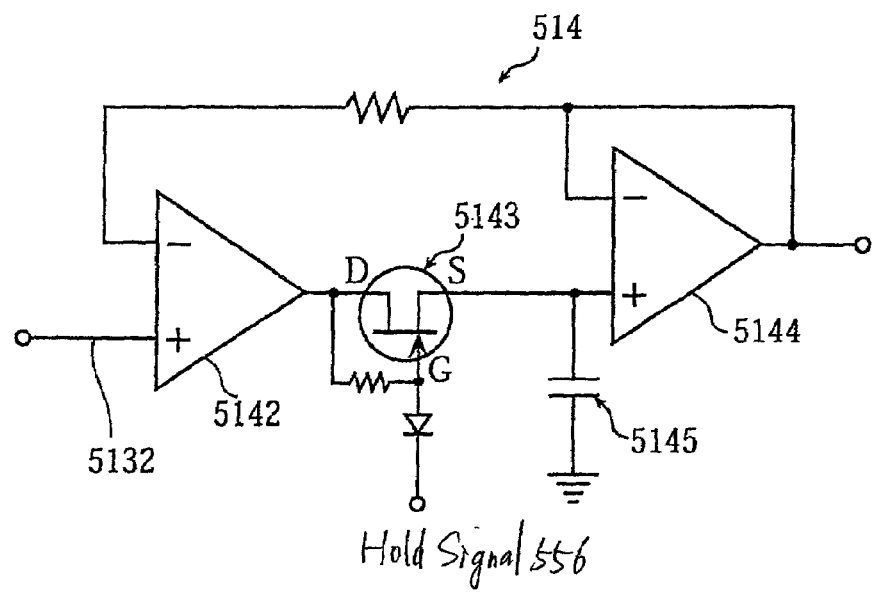
FIG. 7 is a view showing an example of the configuration of a sample hold circuit.

This circuit can be configured a known voltage holding circuit, and realized by, for example, a circuit shown in FIG. 7.

FIG. 7 is a view showing an example of the configuration of the sample hold circuit 514.

As shown in the figure, the sample hold circuit 514 consists of comparators 5142 and 5144, an FET 5143 serving as a switch circuit, a capacitor 5145 for holding a voltage, etc. The output terminal of the comparator 5142 is connected to the non-inverting input terminal of the comparator 5144 via the FET 5143. The output terminal of the comparator 5144 is connected to the inverting input terminal so as to configure a voltage follower, and also to the non-inverting input terminal of the comparator 5142 via a resistor.

When the hold signal 556 becomes "H" level and the FET 5143 is turned ON, therefore, the capacitor 5145 is charged until the output voltage of the comparator 5144 becomes equal to the voltage of the threshold signal 5132 which is supplied to the comparator 5142.

By contrast, when the hold signal 556 becomes "L" level, the FET 5143 is turned OFF. However, the state where the charging voltage of the capacitor 5145 is applied to the comparator 5144 is continued. Therefore, the comparator 5144 continues outputting the voltage at the timing when the hold signal 556 is changed from "H" level to "L" level. In this case, since the FET 5143 is turned OFF, the output voltage of the comparator 5144 is not affected by the voltage change of the threshold signal 5132.

When the hold signal 556 is again changed from "L" level to "H" level, the FET 5143 is turned ON, and the same operations as those described above are repeated.

The voltage holding time of the capacitor 5145 depends on the capacitance of the capacitor 5145, and is previously determined so that, even when at least the time period for receiving a bit string (corresponding to one scanning line) constituting one frame of the bit serial data 551 has elapsed, the held voltage is not substantially lowered.

Returning to FIG. 5, the comparator 515 receives the signal 5131 output from the ATC circuit 513, and a signal 5141 output from the sample hold circuit 514 (hereinafter, the signal is referred to as "threshold signal 5141"), and compares the voltages of the signals with each other, thereby reproducing the digital signal.

Specifically, when reception of the synchronizing data 601 is started, the hold signal 556 becomes "H" level (the hold signal 555 becomes "L" level) (see FIG. 4), and hence the sample hold circuit 514 outputs the threshold signal 5141 which is equal in voltage to the threshold signal 5132 output from the ATC circuit 513 (cancellation of the voltage holding operation). In the same manner as the threshold signal 5132 shown in FIG. 6, therefore, the voltage of the threshold signal 5141 is stabilized in a state where it finely vibrates in level with respect to about one half of the signal of "1." While using the voltage of the threshold signal 5141 as the threshold voltage, the comparator 515 compares the voltage of the signal 5131, and outputs a signal consisting of a bit string in which "1" and "0" are alternatingly repeated.

When the hold signal 556 is changed from "H" level to "L" level (the hold signal 555 is changed from "L" level to "H" level) immediately before the reception of the synchronizing data 601 is ended (see FIG. 4), the sample hold circuit 514 holds the voltage of the threshold signal 5141 at this timing (start of the voltage holding operation).

During the reception of a start bit 602 and effective data 606 which are thereafter received, therefore, the voltage of the threshold signal 5141 the voltage of which is held by the sample hold circuit 514 and is about one half of a signal of "1" is not varied, and, while using the voltage as the threshold voltage, the start bit 602 and the effective data 606 are reproduced as digital signals.

When image data 605 in which data of "0" is continued for a long time period (in the embodiment, a time period corresponding to one scanning line) is received before the synchronizing data 601 is received, the voltage of the threshold signal 5132 is substantially lowered as described above. Therefore, the time period of transmitting the synchronizing data 601 is determined so that, during reception of the synchronizing data 601, at least the voltage of the threshold signal 5132 is raised to a voltage that is about one half of a signal of "1" (hereinafter, such a voltage is referred to "adequate value"), to enter a stable state. According to this configuration, even after data of "0" is continued for a long time period, the bit serial data 551 which is thereafter sent can be correctly reproduced.

As described above, in the embodiment, the image data 605 is received under a state where the threshold voltage is adjusted and held to the adequate value by using the synchronizing data 601. In reproduction of a digital signal from an optical signal sent via an optical fiber cable, unlike the conventional art, there does not arise a problem in that, because of the configuration wherein the threshold voltage is adjusted even during reception of image data, the threshold voltage is lowered by continuation of data of "0" for a long time period, and, when data of "1" is thereafter input, the rising of the threshold voltage is delayed and a reproduced signal of "1" is distorted. As a result, unlike the conventional art, it is not required to determine the data transmission speed in consideration of continuation of data of "0," and hence the data transmission speed can be made higher.

Figure 8:
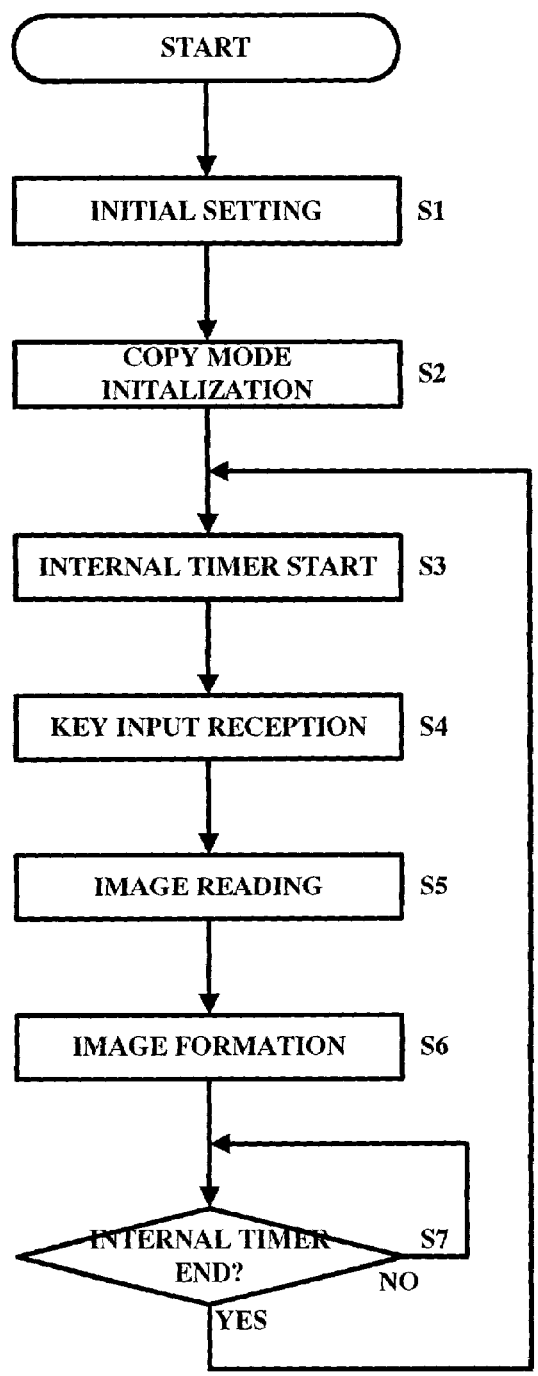
FIG. 8 is a view showing a main routine of the control operation of the entire copier.

FIG. 8 is a view showing a main routine of the control operation of the entire copier.

When the copier 1 is powered ON, the controlling unit 40 first performs initialization in order to clear contents of a RAM (not shown) in the controlling unit 40 and initialize various registers, and also a process of initializing the copy mode (steps S1 and S2).

Then, an internal timer is started in step S3. The process time period of one routine of the main routine is set by the internal timer. The process of receiving key inputs which are performed on the operation panel 300 by the user is performed (step S4). In response to instructions for starting a copying process, the image reader unit 200 performs the process of reading an image of an original (step S5). As described above, the read image data is temporarily stored in the image memory 301 of the image data transmitting section 30.

The controlling unit 40 reads out image data which is to be subjected to image formation, from the image memory 301. The read image data is configured as the bit serial data 551 in the serial data transmitting portion 302, and then sent out to the print processing section 50 via the optical fiber cable 204.

The print processing section 50 optically modulates the laser diodes 61 and 62 on the basis of the image data in the received bit serial data 551. In synchronization with the operation of the print processing section 50, the controlling unit 40 controls the operations of various sections such as the exposure scanning section 60, the image forming section 70, and the sheet conveying section 80 so as to perform the image forming process (step S6).

After the internal timer counts up, the control returns to step S3 (step S7).

Figure 9:
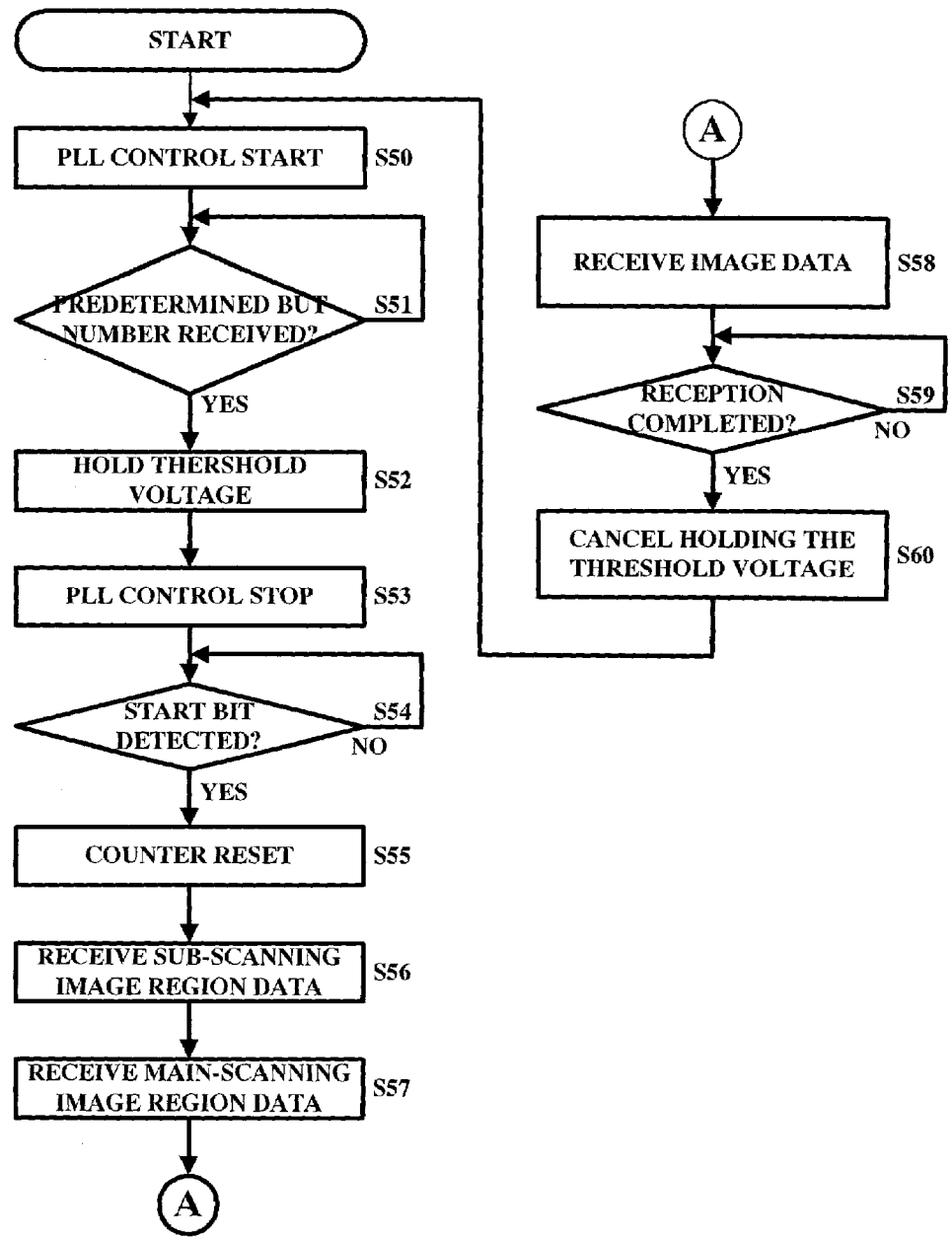
FIG. 9 is a flowchart showing process contents of a data demodulating portion of the print processing section in an image forming process of the main routine shown in FIG. 8.

FIG. 9 is a flowchart showing process contents of the data demodulating portion 52 of the print processing section 50 in the image forming process (S6) of the main routine shown in FIG. 8.

First, when reception of the bit serial data 551 of the first frame from the light receiving portion 51 is started, the data demodulating portion 52 controls the PLL circuit portion 54 so as to start the PLL control (step S50). The PLL control is started by setting the level of the hold signal 555 to "L." This setting of the "L" level of the hold signal 555 causes the level of the hold signal 556 to be "H" level, and hence also the operation of canceling the holding of the threshold voltage by the sample hold circuit 514 is performed.

It is judged whether the received bit number of the synchronizing data 601 reaches a predetermined number or not. If it is judged that the received bit number reaches the predetermined number ("Y" in step S51), the hold signal 555 is set to "H" level to start the operation of holding the threshold voltage, and the PLL control is stopped (steps S52 and S53). As a result, the threshold voltage is held to the adequate value, and the reception clock signal 553 for sampling the effective data 606 is produced.

If the start bit 602 is then detected ("Y" in step S54), the count value of the counter 521 is reset, and the operation of counting the bit number of the effective data 606 which is sent after the start bit 602 is started (step S55).

First, data of a bit number corresponding to the sub-scanning image region data 603 of the image data which is to be subjected to image formation is received (step S56). Then, data of a bit number corresponding to the main-scanning image region data 604 of the image data is received (step S57).

Thereafter, the image data 605 which is to be subjected to image formation is received (step S58). If reception of data of a bit number corresponding to the image data 605 has been completed ("Y" in step S59), it is judged that the reception of the effective data 606 has been ended and reception of the synchronizing data 601 of the second frame is to be then started. The hold signal 555 is changed to "L" level (the hold signal 556 is changed to "H" level), the operation of holding the threshold voltage by the sample hold circuit 514 is canceled (step S60), and the control returns to step S50 to start the PLL control by the PLL circuit portion 54.

When the above-described processes are repeatedly performed, the effective data 606 supplied to the light receiving portion 51 is correctly reproduced on the basis of the threshold voltage which is held by the sample hold circuit 514 during the reception of the synchronizing data 601, and then sampled by the reception clock signal 553 which is similarly produced during the reception of the synchronizing data 601.

It is a matter of course that the invention is not restricted to the embodiment described above. The following modifications may be employed.

(1) In the embodiment described above, the operations of holding the threshold voltage by the sample hold circuit 514 and canceling the holding are executed in accordance with the timings of stopping and starting the PLL control. The invention is not restricted to this. For example, it is possible to use a main-scanning image synchronization signal which is output as a detection signal by an SOS sensor (not shown) disposed in the vicinity of the exposure scanning starting position of the photosensitive drum each time when the sensor is illuminated with a laser beam.

Figure 10:
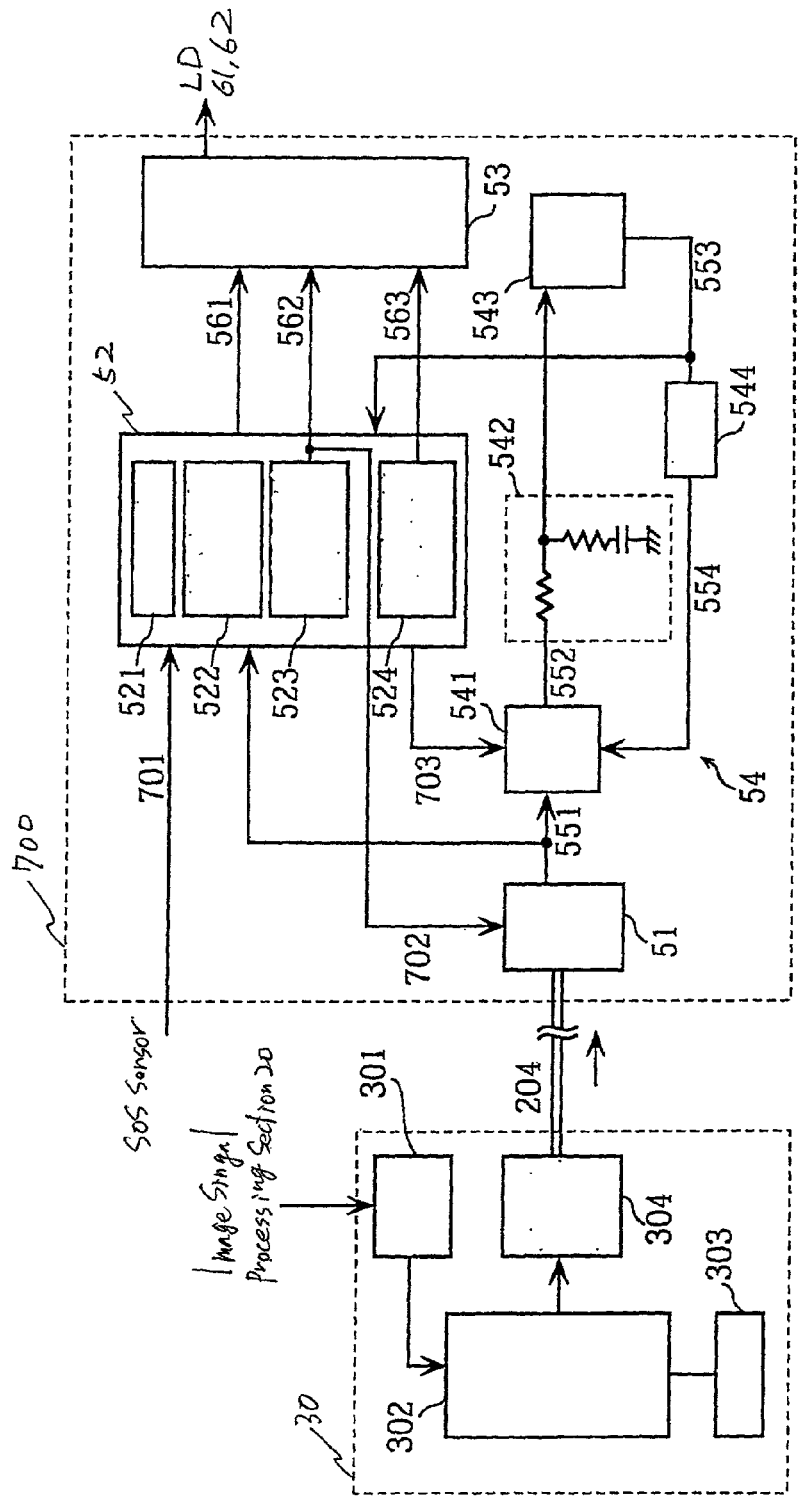
FIG. 10 is a view showing an example of the configuration of a print processing section which performs operations of holding a threshold voltage and canceling the holding by using a main-scanning image synchronization signal.

FIG. 10 is a view showing an example of the configuration of a print processing section 700 which performs operations of holding the threshold voltage and canceling the holding by using the main scanning image synchronization signal 701.

As shown in the figure, the print processing section 700 is configured so that a hold signal 702 for the operations of holding the threshold voltage and canceling the holding is output from the main-scanning region signal producing portion 523. This configuration is different from the print processing section 50 described above. The hold signal used for starting and stopping the PLL control is supplied from the data demodulating portion 52 to the phase comparator 541 as indicated by 703.

The print processing section 700 instructs the controlling unit 40 so as to start exposure scanning of image data for one scanning line, each time when a predetermined time period elapses after the main-scanning image synchronization signal 701 is detected, whereby the exposure starting position on the photosensitive drum 71 in the main scanning direction is made constant for every scanning line.

The main-scanning region signal producing portion 523 controls the hold signal 702 so as to execute the operations of holding the threshold voltage and canceling the holding during reception of the synchronizing data 601. Specifically, when a predetermined time period elapses after reception of the main-scanning image synchronization signal 701, the level of the hold signal 702 is changed from "L" to "H" to cancel the operation of holding the threshold voltage.

The predetermined time period means a time period which is set so that, when the predetermined time period elapses, a state where reception of the synchronizing data 601 is just started is attained. The predetermined time period is previously determined in accordance with experiments or the like, and then stored into a ROM which is not shown. The elapse of the predetermined time period is detected by operating a counter which is not shown, and detecting that the value of the counter reaches a value corresponding to the predetermined time period. The number of received bits of the synchronizing data 601 after the elapse is counted. When the counted number reaches a value which corresponds to a timing immediately before the end of the reception, the hold signal 702 is changed to "L" level to start the operation of holding the threshold voltage.

(2) Alternatively, a sub-scanning image synchronization signal which is employed for determining the timing of starting exposure of the image data in the sub-scanning direction may be used.

Figure 11:
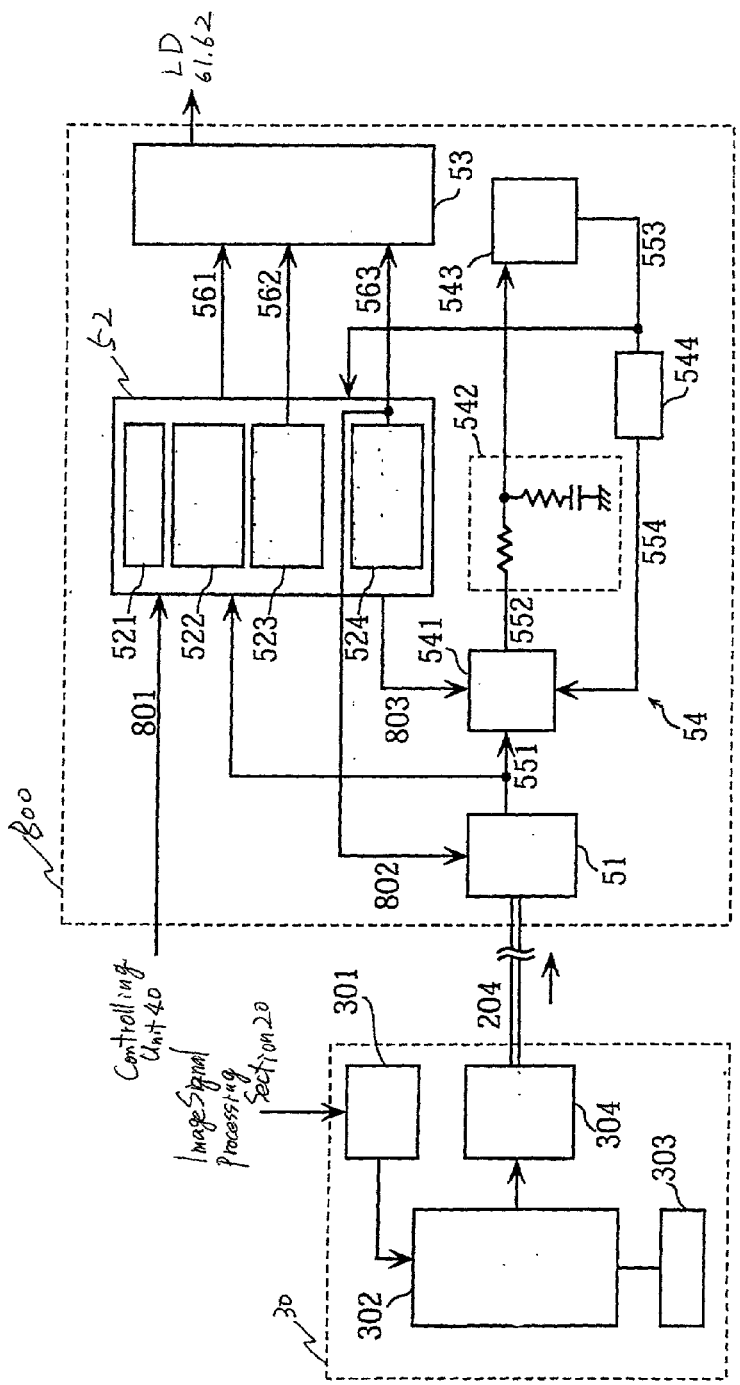
FIG. 11 is a view showing an example of the configuration of a print processing section which performs operations of holding a threshold voltage and canceling the holding by using a sub-scanning image synchronization signal.

FIG. 11 is a view showing an example of the configuration of a print processing section 800 which performs operations of holding the threshold voltage and canceling the holding by using a sub-scanning image synchronization signal 801.

As shown in the figure, the print processing section 800 is configured so that a hold signal 802 for the operations of holding the threshold voltage and canceling the holding is output from the sub-scanning region signal producing portion 524. This configuration is different from the print processing section 50 described above. The hold signal used for starting and stopping the PLL control is supplied from the data demodulating portion 52 to the phase comparator 541 as indicated by 803.

The sub-scanning image synchronization signal 801 is output from the controlling unit 40 in order to indicate the start of the operation of the timing roller 85. After a predetermined time period elapses after the output of the sub-scanning image synchronization signal 801, the controlling unit 40 starts the exposure scanning of the image data, so that the toner image formed on the photosensitive drum 71 is transferred to a predetermined position on the sheet which is conveyed to the transferring position.

When the sub-scanning region signal producing portion 524 receives the sub-scanning image synchronization signal 801, the portion 524 changes the level of the hold signal 802 from "L" to "H" after elapse of a predetermined time period, to cancel the operation of holding the threshold voltage. In the same manner as the above-mentioned case where the main-scanning image synchronization signal 701 is used, the predetermined time period means a time period which is set so that, when the predetermined time period elapses, a state where reception of the synchronizing data 601 of the first scanning line is just started is attained. The predetermined time period is previously determined in accordance with experiments or the like, and then stored into a ROM which is not shown. The elapse of the predetermined time period is detected by operating a counter which is not shown, and detecting that the value of the counter reaches a value corresponding to the predetermined time period. The number of received bits of the synchronizing data 601 after the elapse is counted. When the counted number reaches a value which corresponds to a timing immediately before the end of the reception, the hold signal 802 is changed to "L" level to start the operation of holding the threshold voltage. After the reception of the image data 605 of the final scanning line of the page, i.e., the operation of forming an image of the page is ended, the voltage holding operation is continued until the sub-scanning image synchronization signal 801 corresponding to the operation of forming an image of the next page is detected. When the sub-scanning image synchronization signal 801 is detected, the above-described operation is repeatedly performed. According to this configuration, in a case where the operation of holding the threshold voltage is not required to be performed for each scanning line, for example, the threshold voltage can be adjusted and held in the unit of page.

In this modification, the capacitance of the capacitor 5145 of the sample hold circuit 514 is previously determined so that the threshold voltage is held to the adequate value until reception of all image data of one page is completed.

(3) In the embodiment described above, the received bit number is counted after the start bit 602 is received, and the operation of holding the threshold voltage or canceling the holding is executed when the count value reaches a value corresponding to a timing immediately before that when reception of the synchronizing data 601 is started or ended. The invention is not restricted to this. For example, detecting means for detecting whether the received data is a specific pattern signal in which "0" and "1" are alternatingly repeated or not may be disposed. When the detecting means detects the specific pattern signal, it may be judged that the signal is synchronizing data, and the operations of holding the threshold voltage and canceling the holding may be executed during reception of the synchronizing data.

(4) In the embodiment described above, synchronizing data which is used for the PLL control is utilized for adjusting and holding the threshold voltage to the adequate value. The invention is not restricted to this. For example, the invention may be applied to a case where the print processing section 50 does not use the PLL control and synchronizing data is not contained in transmission data. Specifically, a signal in which "0" and "1" appear in a specific pattern before effective data, such as that in which "0" and "1" are alternatingly repeated as in the case of synchronizing data, or that in which data of "1," "1," and "0" are alternatingly repeated may be added as control data. Detecting means for detecting the pattern may be disposed. When the signal is detected, the operations of holding the threshold voltage and canceling the holding may be executed during reception of the signal. The pattern is not particularly restricted as far as it allows the threshold voltage to be held to the adequate value during reception of the control data. The pattern may be previously determined in accordance with experiments or the like.

(5) In the embodiment described above, the conventional ATC circuit 513 is used, and hence the sample hold circuit 514 is additionally disposed in the light receiving portion 51. The invention is not restricted to this. These circuits may be configured by a single circuit. The adequate value of the threshold voltage is not restricted to about one half of the voltage of an input signal. In accordance with the data transmission speed, any value such as one third of the voltage may be employed.

(6) In the embodiment described above, the optical communication system using an optical fiber is used as the data communication system from the transmitting side to the receiving side. The invention is not restricted to this. For example, the invention may be applied to a data receiver in which another communication system such as the electrical communication is used. The invention may be applied not only to a data receiver of wire communication, but also to that of wireless communication.

(7) In the embodiment described above, the data receiver of the invention is applied to the receiver for receiving image data which is transmitted from the image reader unit. It is a matter of course that the data receiver is not restricted to a receiver for receiving image data. For example, the data receiver may be applied also to a receiver for various data which is transmitted and received between the controlling unit 40 and the print processing section 50. The data receiver of the invention may be applied to usual image forming apparatuses such as a facsimile apparatus and a printer, in addition to a copier. Alternatively, the data receiver may be applied to a receiver for receiving image data which is transmitted and received between a personal computer and its peripheral device.

As described above, according to the invention, the data receiver comprises: threshold adjusting and holding means for adjusting and holding a threshold for binarizing effective data on the basis of a size of a signal of control data; and reproducing means for reproducing a digital signal from the effective data on the basis of the threshold which is held by the threshold adjusting and holding means. Unlike the conventional art, therefore, there does not arise a problem in that, because of the configuration wherein the threshold is adjusted even during reception of effective data, the threshold is lowered by continuation of data of "0" for a long time period, and, when data of "1" is thereafter input, the rising of the threshold is delayed and a reproduced signal of "1" is distorted. As a result, unlike the conventional art, it is not required to determine the data transmission speed in consideration of continuation of data of "0," and hence the data transmission speed can be made higher.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An image processing apparatus, comprising:
   a receiver for receiving an optical signal for plural frames, each of the frames containing control data and raster image data subsequent to the control data;
   a threshold value holding unit for holding a threshold value which is adjusted on the basis of a size of the control data; and
   a quantizing unit for quantizing the image data on the basis of the threshold value held by said threshold value holding unit.

2. An image processing apparatus as claimed in claim 1, wherein each of the frames includes image data of one line in a main scanning direction.

3. An image processing apparatus as claimed in claim 2, wherein said threshold value holding unit holds the adjusted threshold value when a predetermined time period elapses after a reference signal for reading the image data is received.

4. An image processing apparatus as claimed in claim 2, wherein said threshold value holding unit cancels the holding of the threshold value when a predetermined time period elapses after a main scanning image synchronization signal is received.

5. An image processing apparatus as claimed in claim 2, wherein said threshold value holding unit cancels the holding of the threshold value when a predetermined time period elapses after a sub scanning image synchronization signal is received.

6. An image processing apparatus as claimed in claim 1, wherein said receiver receives optical signals.

7. An image processing apparatus as claimed in claim 6, wherein said quantizing unit outputs electric signals.

8. An image processing apparatus as claimed in claim 1, wherein the control signal includes digital data of a specific bit pattern.

9. An image processing apparatus as claimed in claim 8, further comprising:
   a clock signal generator for producing a reception clock signal on the basis of the control data under a PLL control; and
   a sampling unit for sampling the effective data with the use of the reception clock signal.

10. An image forming apparatus comprising:
    a receiving unit for receiving an optical signal for plural frames, each of the frames containing control data and raster image data subsequent to the control data;
    a threshold value holding unit for holding a threshold value which is adjusted on the basis of a size of the control data;
    a quantizing unit for quantizing the image data on the basis of the threshold value held by said threshold value holding unit; and
    an image forming unit for forming an image on the basis of the image data output from said quantizing unit.

11. An image forming apparatus as claimed in claim 10, wherein said image forming unit includes a photosensitive member and an exposure unit for scanning said photosensitive member in a main scanning direction and sub scanning direction to exposing said photosensitive member.

12. An image forming apparatus as claimed in claim 11, wherein each of the frames includes image data of one line in the main scanning direction.

13. An image forming apparatus as claimed in claim 10, wherein said threshold value holding unit holds the adjusted threshold value when a predetermined time period elapses after a reference signal for reading the image data is received.

14. An image forming apparatus as claimed in claim 11, wherein said threshold value holding unit cancels the holding of the threshold value when a predetermined time period elapses after a main scanning image synchronization signal is received.

15. An image forming apparatus as claimed in claim 14, further comprising a control unit for controlling said exposure unit to start exposure scanning for one scanning line, each time when the a predetermined time period elapses after the main scanning image synchronization signal is received.

16. An image forming apparatus as claimed in claim 11, wherein said threshold value holding unit cancels the holding of the threshold value when a predetermined time period elapses after a sub scanning image synchronization signal is received.

17. An image forming apparatus as claimed in claim 16, further comprising an exposure controller for controlling said exposure unit to start exposure scanning when the predetermined time period elapses after the sub scanning image synchronization signal is received.

18. An image forming apparatus as claimed in claim 10, wherein said receiving unit receives optical signals.

19. An image forming apparatus as claimed in claim 8, wherein said quantizing unit outputs electric signals.

20. An image forming apparatus as claimed in claim 10, wherein the control signal includes digital data of a specific bit pattern.

21. An image forming apparatus as claimed in claim 20, further comprising:
    a clock signal generator for producing a reception clock signal on the basis of the control data under a PLL control; and
    a sampling unit for sampling the effective data by using the reception clock signal.

* * * * *